Feb. 4, 1958  J. KALLWEIT  2,821,782
MAP MEASURING INSTRUMENTS
Filed Jan. 25, 1955  2 Sheets-Sheet 1

INVENTOR
Johannes Kallweit
by Sourn M Beaman
attorney

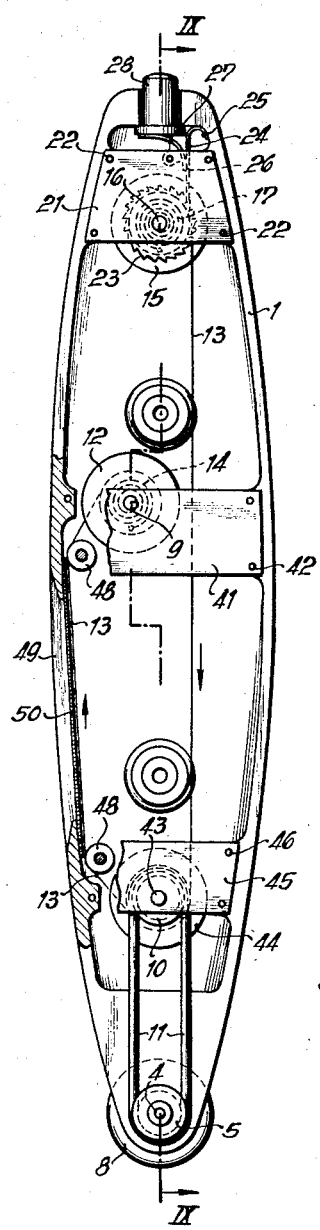

United States Patent Office 2,821,782
Patented Feb. 4, 1958

2,821,782

MAP MEASURING INSTRUMENTS

Johannes Kallweit, Hamburg, Germany

Application January 25, 1955, Serial No. 483,953

6 Claims. (Cl. 33—141)

This invention relates to map measuring instruments wherein a disc rotatably carried by a holder is moved across the map over a selected route and there is means for indicating the distance on the map traversed by the disc.

The object of this invention is the provision of an instrument which is of simple, accurate and robust construction and which may be readily and cheaply manufactured.

Another object of the invention is to enable the instrument readily to be converted for use with maps of different scales.

Yet another object is to ensure that the conversion for use with maps of different scales may be easily and quickly carried out, the accuracy of the instrument being not impaired by repeated conversion over long periods.

A further object is to provide an instrument in which the recording of the distance traversed is performed with a high degree of precision.

Figure 2:
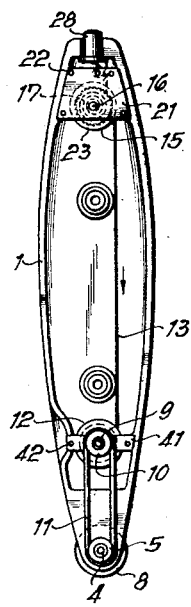
Figure 1:
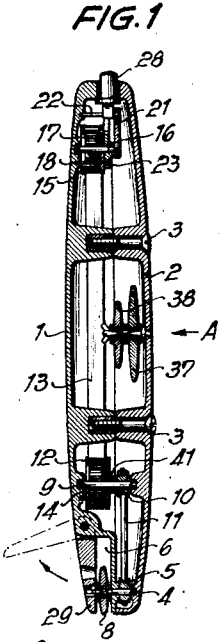
Figure 3:
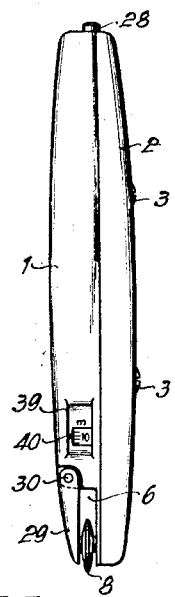
Figure 4:
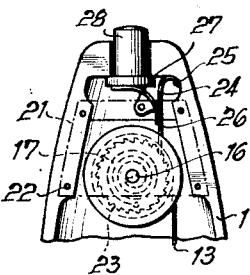
Figure 5:
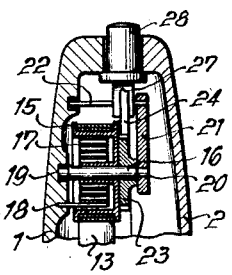
Figure 7:
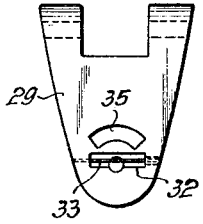
Figure 6:
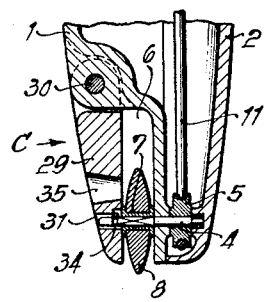
Figure 8:
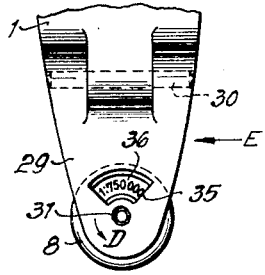

These and other objects of the invention will be understood from the following description of two constructions of instrument according to the invention. The description is made with reference to the accompanying drawings whereof:

Fig. 1 is a longitudinal section of an instrument according to the invention,

Fig. 2 is a view in the direction of the arrow A of Fig. 1, the cover having been removed, Fig. 3 is a side elevation of the instrument shown in Fig. 1, Fig. 4 is a view of the upper part of the instrument of Fig. 1 and to a larger size, Fig. 5 is a transverse section of the instrument of Fig. 4, Fig. 6 is a transverse section of the lower part of the instrument of Fig. 1 and to a larger size, Fig. 7 is a side view showing a detail of Fig. 6 as seen in the direction C of Fig. 6, Fig. 8 is a side view, also in the direction indicated at C in Fig. 6, of the complete end assembly, Fig. 9 is a view corresponding to Fig. 1 and showing a second construction of instrument according to the invention, said view being a section on the line IX—IX of Fig. 10, Fig. 10 is a side view of the instrument of Fig. 9 with the cover removed, and Fig. 11 is an elevation of the complete instrument shown in Figs. 9 and 10.

Referring to Figs. 1 to 8 of the drawings, the instrument comprises a main body 1 and a closure member 2 held together by screws 3. An elongated torpedo-shaped casing is thereby formed which is preferably produced by moulding (synthetic resin) or from light metal by die-casting.

The casing is hollow to receive all the main parts of the instrument. Rotatably mounted in the base of the instrument is a spindle 4 (Fig. 6) to which a pulley 5 is secured (within the hollow casing). Through the agency of a bush 7, a measuring disc 8 of predetermined diameter is non-rotatably secured to the spindle 4 outside the casing and in a space 6 formed between the body 1 and a flap 29.

Rotatably mounted above the spindle 4 is an actuating spindle 9 to which is secured a pulley 10 which is driven from the pulley 5 by a cord 11 e. g. a rubber band. On spindle 9 is a drum 12 and secured to the drum is one end of a scale strip 13. Inside the drum 12 is a spiral spring 14, one end of which is secured to the drum 12 or spindle 9 and the other end of which is secured to the body 1 so that the spiral spring 14 tends to wind up strip 13 on drum 12. The other end of strip 13 is secured to a drum 15 rotatably mounted in body 1 by a spindle 16. One end of a spiral spring 17 is secured to the spindle 16 or drum 15 and the other end to body 1, at 18 (Fig. 5). One end 19 of the spindle 16 is directly mounted in body 1 while the other end 20 is rotatably mounted in a bearing plate 21 which is secured to body 1 being spaced therefrom by pins 22 so that plate 21 lies within the hollow casing. A ratchet wheel 23 fast on spindle 16 lies between plate 21 and drum 15. The free end of a leaf spring 24 engages the teeth of the ratchet wheel and is secured to body 1 at 25. One end 26 of a bell-crank lever 27 bears against the leaf spring, the lever being rotatable in the main body 1. The other end of the lever 27 bears against a button 28 movable lengthwise of body 1 and held in position by member 2. The springs 14 and 17 tend to wind up strip 13 in opposite directions and spring 17 is stronger than spring 14.

The flap 29 (which in part defines space 6) is pivotally mounted in body 1 on a spindle 30. The spindle 4 projects into a bore 31 in the flap 29 which has a recess 32 to accommodate a leaf spring 33. The latter resiliently engages a groove 34 in the spindle 4 to hold flap 29 in the closed position shown in Fig. 6. Flap 29 also has an aperture 35 through which one side of the measuring disc 8 can be seen. The reference 36 in Fig. 8 indicates, through aperture 35, the scale for which the measuring disc is intended.

If the instrument is to be used on a map with a different scale, the measuring disc has to be changed. Conveniently provision is made for storing on the instrument discs for different scales. In the embodiment illustrated, this function is performed by the closure member 2, inside which are secured the two interchangeable discs 37 and 38. To remove the closure member it is necessary first to remove screws 3 in order to gain access to the spare discs.

Fig. 3 shows a window 39 in body 1 and markings 40 on the strip 13 seen through the window. For example, the scale strip can be so calibrated or divided that a 1 mm. length or displacement of the strip corresponds to 1 kilometre on the map. The measuring disc 8 shown in position for use then corresponds, for instance, to a map having a scale of 1:750,000. If the instrument is to be used on a map with a scale of 1:500,000, the measuring disc 38 should be fitted, while the measuring disc 37 is used for a map drawn to a scale of 1:250,000. The measuring disc diameter varies in inverse proportion to the scales of the maps so that, for example a measuring disc for a scale of 1:500,000 need only be one-half as great as for a scale of 1:250,000. This is because the transmission ratio in the instrument does not change although the distance on the map to a scale of 1:500,000 is only one-half as great as on the map to a scale of 1:250,000.

A bearing plate 41 (Fig. 1) is provided for mounting the spindle 9 in the main body 1, the plate being secured to, and spaced from, the main body by pins 42 so that there is room for the drum 12 between the body and plate 41.

The instrument is operated in the following way. It is moved over the distance to be measured in the direction of the arrow E of Fig. 8 so that the measuring disc rotates counter-clockwise in the direction indicated by the arrow D. The scale strip 13, once it has been rolled up to an appropriate extent on the drum 12, can be returned to its zero position by pressing the button 28 to release ratchet wheel 23 so that the spring 17 can now wind the scale strip back on to the drum 15.

With the embodiment hereinbefore described, inaccuracies in measurement may occur, more particularly when relatively long distances are measured continuously. This arises because as the scale strip is wound and unwound, the diameter thereof on the drum 12 (and therefore the transmission ratio) alter. These inaccuracies in measurement are obviated in the preferred embodiment of the invention now about to be described with reference to Figs. 9 to 11. The instrument there shown is generally as already described and reference will therefore be made to the differences which relates to guiding the measuring strip and accommodating the spare measuring discs on the hollow casing.

The instrument illustrated in Figs. 9 to 11 comprises a main body 1 and a closure member 2. Through the agency of pullies 5 and 10 respectively, a measuring disc 8 drives a cord 11, which may take more particularly the form of a rubber band, and a spindle 43, on which latter a driving disc 44 is arranged. Spindles 16 and 9 carry spring-actuated drums 12 and 15 upon which is wound the scale strip 13. A bearing plate 45 serves to support the spindle 43 and is attached to the main body 1 by pins 46. In this embodiment, the spindle 43 also engages in a bush 47 provided in closure member 2. In this way pulley 10 is not overhung. Guide rollers 48 loose in body support the strip 13 so that it moves past a window 49 in body 1, the window being covered by a transparent panel 50 made, for instance, from Plexiglas or Celluloid. A scale mark 58 appears on the panel 50.

As in the first embodiment, two spare measuring discs 37, 38 are provided and are carried in a capsule 51 arranged in a recess or opening 52 in member 2. Capsule 51 is pivotally mounted in member 2 at 53. The capsule has a finger hole 54 to facilitate opening, and also has a lip 55 which resiliently holds the capsule in the closed position. The two spare discs 37, 38 are slid on to a pin 56 secured to the capsule 51. A wing nut 57 secures the two spare discs 37, 38 on pin 56. For the rest, the linear measuring instrument is constructed in the same way as the instrument of Figs. 1 to 8 and need not be described in more detail.

I claim:

1. A map measuring instrument comprising a hollow pencil casing having a window through the wall thereof, a pair of rollers rotatably mounted within the casing, a graduated strip which is wound around the rollers and passes behind said window, a disc to engage the map surface and which is rotated when the instrument is moved over the map, a driving mechanism connecting said disc with the strip so that with rotation of the disc the strip is moved past said window from one roller to the other, said driving mechanism including a driving pulley, said strip going from one roller to the other around said driving pulley by which the strip is wound off one roller and onto the other roller, said driving pulley being driven by said disc through the remainder of said driving mechanism.

2. A map measuring instrument comprising a hollow pencil casing having a window through the wall thereof, a pair of rollers rotatably mounted within the casing, a graduated strip which is wound around the rollers, and passes behind said window, a spring for each roller to rotate the roller, the spring of one roller being more powerful than of the other roller, a pawl and ratchet mechanism to hold the roller having the more powerful spring against rotation, means to release the pawl and ratchet mechanism for rotation of its roller, a disc to engage the map surface and which is rotated when the instrument is moved over the map, and a driving mechanism connecting said disc with the strip so that with rotation of the disc the strip is moved past said window from the roller controlled by the ratchet mechanism to the other roller.

3. A map measuring instrument comprising a hollow pencil casing having a window through the wall thereof, a pair of rollers rotatably mounted within the casing, a graduated strip which is wound around the rollers, and passes behind said window, a spring for each roller to rotate the roller, the spring of one roller being more powerful than of the other roller, a pawl and ratchet mechanism to hold the roller having the more powerful spring against rotation, a manual control to release the pawl and ratchet mechanism for rotation of its roller, a disc to engage the map surface and which is rotated when the instrument is moved over the map, a driving mechanism connecting said disc with the strip so that with rotation of the disc the strip is moved past said window from the roller controlled by the ratchet mechanism to the other roller, a flap pivotally carried by the casing and spaced therefrom to accommodate said disc, a support for the disc carried by said casing and a support for the disc carried by said flap which may be raised for interchanging discs.

4. A map measuring instrument as claimed in claim 1 in which said disc is at one end of the casing and the rollers and the driving pulley are substantially in line along the length of the casing, the driving pulley being nearer the disc end of the casing than either of said rollers.

5. A map measuring instrument comprising a hollow pencil casing having a window through the wall thereof, a pair of rollers rotatably mounted within the casing, a graduated strip which is wound around the rollers and passes behind said window, a disc to engage the map surface and which is rotated when the instrument is moved over the map, a driving mechanism connecting said disc with the strip so that with rotation of the disc the strip is moved past said window from one roller to the other, a spring operated resetting mechanism for said graduated strip which becomes tensioned when said strip moves past said window, a flap pivotally carried by the casing and spaced therefrom to accommodate said disc, a support for the disc carried by said casing and a support for the disc carried by said flap which may be raised for interchanging discs.

6. A map measuring instrument comprising a hollow pencil casing having a window through the wall thereof, a pair of rollers rotatably mounted within the casing, a graduated strip which is wound around the rollers and passes behind said window, a disc to engage the map surface and which is rotated when the instrument is moved over the map, a driving mechanism connecting said disc with the strip so that with rotation of the disc the strip is moved past said window from one roller to the other, a spring operated resetting mechanism for said graduated strip which becomes tensioned when said strip moves past said window, a flap pivotally carried by the casing and spaced therefrom to accommodate said disc, a support for the disc carried by said casing, a support for the disc carried by said flap which may be raised for interchanging discs and a support within the casing for removably holding discs of different diameters.

References Cited in the file of this patent
UNITED STATES PATENTS

| | | |
|---|---|---|
| 700,286 | Arthur | May 20, 1902 |
| 2,000,625 | Vaughan | May 7, 1935 |
| 2,484,151 | Brownell | Oct. 11, 1949 |
| 2,557,212 | Alfrey | June 19, 1951 |

UNITED STATES PATENT OFFICE
CERTIFICATE OF CORRECTION

Patent No. 2,821,782                                  February 4, 1958

Johannes Kallweit

It is hereby certified that error appears in the above numbered patent requiring correction and that the said Letters Patent should read as corrected below.

In the heading to the printed specification, between lines 4 and 5, insert

-- Claims priority, application Germany January 27, 1954 --.

Signed and sealed this 20th day of May 1958.

(SEAL)
Attest:

KARL H. AXLINE                                        ROBERT C. WATSON
Attesting Officer                                    Commissioner of Patents